US007177425B2

(12) United States Patent
Ben-Chuan et al.

(10) Patent No.: US 7,177,425 B2
(45) Date of Patent: Feb. 13, 2007

(54) DEVICE AND METHOD FOR SECURING INFORMATION ASSOCIATED WITH A SUBSCRIBER IN A COMMUNICATION APPARATUS

(75) Inventors: Du Ben-Chuan, Taoyuan (TW); Fan Chen-Huang, Taoyuan (TW)

(73) Assignee: Benq Corporation, Taoyuan (TW)

( * ) Notice: Subject to any disclaimer, the term of this patent is extended or adjusted under 35 U.S.C. 154(b) by 754 days.

(21) Appl. No.: 10/618,177

(22) Filed: Jul. 10, 2003

(65) Prior Publication Data
US 2004/0013269 A1 Jan. 22, 2004

(30) Foreign Application Priority Data
Jul. 10, 2002 (TW) ................. 91115362 A

(51) Int. Cl.
*H04L 9/00* (2006.01)
*H04L 9/32* (2006.01)
(52) U.S. Cl. .................. 380/44; 380/277; 713/189; 713/192; 713/193
(58) Field of Classification Search ............. 380/44, 380/28, 277, 286; 713/181, 189, 192–193
See application file for complete search history.

(56) References Cited

U.S. PATENT DOCUMENTS 4,941,176 A * 7/1990 Matyas et al. ............. 380/280
5,481,613 A * 1/1996 Ford et al. ................. 380/30
5,623,546 A * 4/1997 Hardy et al. ............... 713/193

FOREIGN PATENT DOCUMENTS

JP 2001-309433 A 2/2001

OTHER PUBLICATIONS

Abstract of JP2001309433 A, Patent Abstracts of Japan, available at esp@cenet database.

\* cited by examiner

*Primary Examiner*—Hosuk Song
(74) *Attorney, Agent, or Firm*—Birch, Stewart, Kolasch & Birch, LLP

(57) ABSTRACT

The invention provides a device, used in a communication apparatus including a cipher-key generating module, for securing a subscriber's information. The device includes a storage module, a cipher-key acquiring module, an encrypting module and a decrypting module. The subscriber's information is stored in the storage module. The cipher-key acquiring module transmits an input to the cipher-key generating module, and then receives a cipher key generated by the cipher-key generating module in response to the input. The encrypting module retrieves the cipher key through the cipher-key acquiring module, retrieves the subscriber's information from the storage module, and encrypts the subscriber's information using the cipher key to generate an encrypted information. After generated, the encrypted information is stored into the storage module and replaces the subscriber's information. When the subscriber's information needs to be used, the decrypting module retrieves the cipher key through the cipher-key acquiring module, retrieves the encrypted information, and decrypts the encrypted information using the cipher key to recover the subscriber's information. When the decrypting module retrieves the cipher key through the cipher-key acquiring module, the cipher-key acquiring module transmits the input once more to the cipher-key generating module, and then receives the cipher key generated once more by the cipher-key generating module in response to the input.

22 Claims, 4 Drawing Sheets

DEVICE AND METHOD FOR SECURING INFORMATION ASSOCIATED WITH A SUBSCRIBER IN A COMMUNICATION APPARATUS

FIELD OF THE INVENTION

The present invention relates to a device, used in a communication apparatus, such as telephone, mobile phone, PDA, and other portable communication apparatus; more particularly, a device for securing information associated with a subscriber.

BACKGROUND OF THE INVENTION

There are some mobile phones, PDA, and other portable communication apparatus with storage functions capable of storing the personal private information such as address book and schedule. In order to prevent another person from using the communication apparatus and further, grabbing the private information stored in the communication apparatus, the communication apparatus usually needs more securing function to secure the private information against grabbing.

Taking the present mobile phone as an example, the user generally needs to insert the Subscriber Identity Module (SIM) card to start the communicating function of the mobile phone. The SIM card usually has the function of generating a cipher key. The calculating algorithm in the SIM card for generating the cipher key can be Hash-based Message Authentication Code (HMAC), GSM-A3, GSM-A8. It is very difficult to crack the calculating algorithm. Consequently, the SIM card is the most popular securing system. There are two method of securing the private information associated with the subscriber. One is to lock the SIM card by a password that is inputted by the users, and the other is to lock the mobile phone by a password.

The first method according to the prior art takes advantage of the SIM card to secure private information associated with the subscriber. However, the first method according to the prior art only secures private information that stored in the SIM card, without securing the information stored in the mobile phone. As a result, when a user loses his mobile phone, the other person can use this mobile phone by another SIM card, even grab the information stored in the phone.

The second method according to the prior art takes advantage of the password to lock the mobile phone. When a user loses his mobile phone, the other person needs to input the password to unlock this mobile phone even though the other person has a SIM card. By this way, it can resolve the drawback of the first method according to the prior art. Nevertheless, if many persons want to use the same mobile phone, it needs another system to verify the different IDs and their corresponding passwords. This results in the more complicated system and high cost.

Besides, the safety of the second method according to the prior art depends on the circuit design of mobile phone. Generally speaking, the circuit design of mobile phone is not good enough to take severe precautions against the cracker.

SUMMARY OF THE INVENTION

It is therefore a primary objective of the present invention to provide a device for securing private information associated with the subscriber in a communication apparatus.

The present provides a device, used in a communication apparatus, secures the information associated with a subscriber. The communication apparatus comprises a cipher-key generating module for generating a cipher key. The device comprises a storage module, a cipher key acquiring module, an encrypting module and a decrypting module. The information associated with the subscriber is stored in the storage module. The cipher-key acquiring module transmits an input to the cipher-key generating module, and then receives the cipher key generated by the cipher-key generating module in response to the input. The encrypting module retrieves the cipher key through the cipher-key acquiring module, retrieves the information associated the subscriber from the storage module, and encrypts the information associated with the subscriber using the cipher key to generate encrypted information. The encrypted information is stored in the storage module and replaces the information associated with the subscriber stored in the storage module. The decrypting module retrieves the cipher key through the cipher-key acquiring module, retrieves the encrypted information from the storage module, and decrypts the encrypted information using the cipher key to recover the information associated with the subscriber when the information associated with the subscriber needs to be used. When the decrypting module retrieves the cipher key through the cipher-key acquiring module, the cipher-key acquiring module transmits the input once more to the cipher-key generating module, and then receives the cipher key generated once more by the cipher-key generating module in response to the input.

It is am advantage of the present invention that the communication apparatus comprises a cipher-key generating module, such as subscriber information module card, SIM card. The device retrieves the cipher key through the cipher-key generating module to encrypt or decrypt the information associated with the subscriber; therefore, secures the information associated with a subscriber.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Hereinafter, embodiments of the present invention will be explained with reference to the attached drawings. A device according to an embodiment of the present invention carries out securing private information associated with the subscriber in a communication apparatus.

Figure 1:
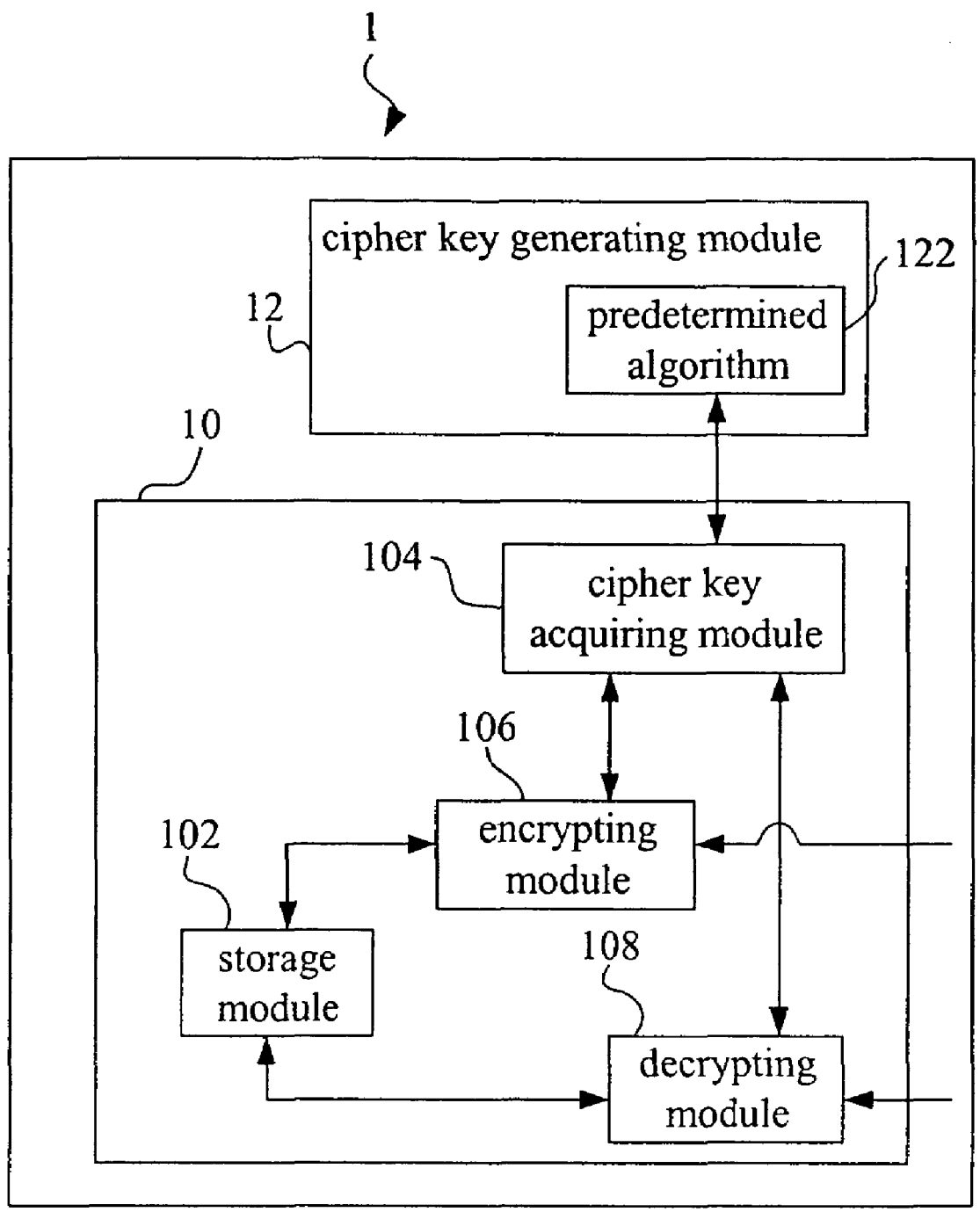
FIG. 1 is a schematic diagram showing a secure advice in a communication apparatus according to the preferred embodiment of the present invention, and showing the relationship between the secure device and the communication apparatus.

Please referring to FIG. 1, FIG. 1 is a schematic diagram showing a secure advice 10 in a communication apparatus 1 according to the preferred embodiment of the present invention. The secure advice 10 is used in the communication apparatus for securing the personal private information in the communication apparatus 1. The communication apparatus 1 comprises a cipher-key generating module 12 for generating a cipher key.

The secure advice 10 comprises a storage module 102, a cipher-key acquiring module 104, an encrypting module 106 and a decrypting module 108. The information associated with the subscriber is stored in the storage module 102. The cipher-key acquiring module 104 transmits an input to the cipher-key generating module 12. The input is a hardware serial number, which is stored in the communication apparatus 1. The serial number can be International Mobile Equipment Identity (IMEI) for example. When the cipher-key generating module 12 receives the input, it will response to the input and generate a cipher key.

The cipher-key generating module 12 according to the embodiment of the present invention has a predetermined algorithm. The predetermined algorithm 122 is illustrated in FIG. 1. The input is applied to the predetermined algorithm 122 to generate the cipher key.

The cipher-key generating module 12 can be a Subscriber Identity Module (SIM) card. The predetermined algorithm 122 can be Hash-based Message Authentication Code (HMAC), GSM-A3, or GSM-A8.

The other method for generating the cipher key can work without the predetermined algorithm 122. The cipher-key generating module 12 previously stores a subscriber code such as International Mobile Subscriber Identity (IMSI). The cipher-key generating module 12 transmits the subscriber code as the cipher key in response to the input.

The encrypting module 106 retrieves the cipher key through the cipher-key acquiring module 104, and retrieves the information associated the subscriber from the storage module 102. Afterwards, the encrypting module 106 encrypts the information associated with the subscriber by the cipher key to generate an encrypted information. After the encrypted information is generated, the encrypted information is stored in the storage module 102, and replaces the information associated with the subscriber stored in the storage module 102. As shown in FIG. 1, the encrypting module 106 is driven by the control signal from the communication apparatus 1 and then encrypts the information associated with the subscriber in practical application.

Furthermore, as information associated with the subscriber needs to be used, the decrypting module 108 retrieves the cipher key through the cipher-key acquiring module 104, retrieves the encrypted information from the storage module 102, and decrypts the encrypted information with the cipher key to recover the information associated with the subscriber. When the decrypting module 108 retrieves the cipher key through the cipher-key acquiring module 104, the cipher-key acquiring module 104 transmits the input once more to the cipher-key generating module 12, and then receives the cipher key generated once more by the cipher-key generating module 12 in response to the input. As shown in FIG. 1, the encrypting module 108 is driven by the control signal from the communication apparatus 1 and then decrypts the information associated with the subscriber in practical application.

The encrypting module 106 and the decrypting module 108 are implemented in a same module in practical application.

While the invention has been described in the preferred embodiments, it is obvious that the cipher key is essential for the decrypting module 108 to decrypt the encrypted information associated with the subscriber. As the cipher key is not stored in the communication apparatus 1 and the secure advice 10, it is vitally important to receive the cipher key by the cipher-key generating module 12, such as SIM card. Therefore, if a user loses the communication apparatus 1, it is very hard for the other person to decrypt the encrypted information associated with the original subscriber. With the high securing safety of the cipher-key generating module 12, SIM card for example, the secure advice 10 according to the preferred embodiment of the present invention can provide adequate security. Furthermore, the design of the secure advice 10 is easier than the prior art and the communication apparatus 1 does not need other complicated elements, and hence the manufacturing cost is lower.

If other people want to use the same communication apparatus 1, it is easy to secure the encrypted information associated with the subscriber by using their own cipher-key generating module 12, SIM card for example. One person can not decrypt the encrypted information associated with the other subscriber. So the present invention provides a cheaper and uncomplicated system to secure the encrypted information associated with the different subscribers.

Figure 2:
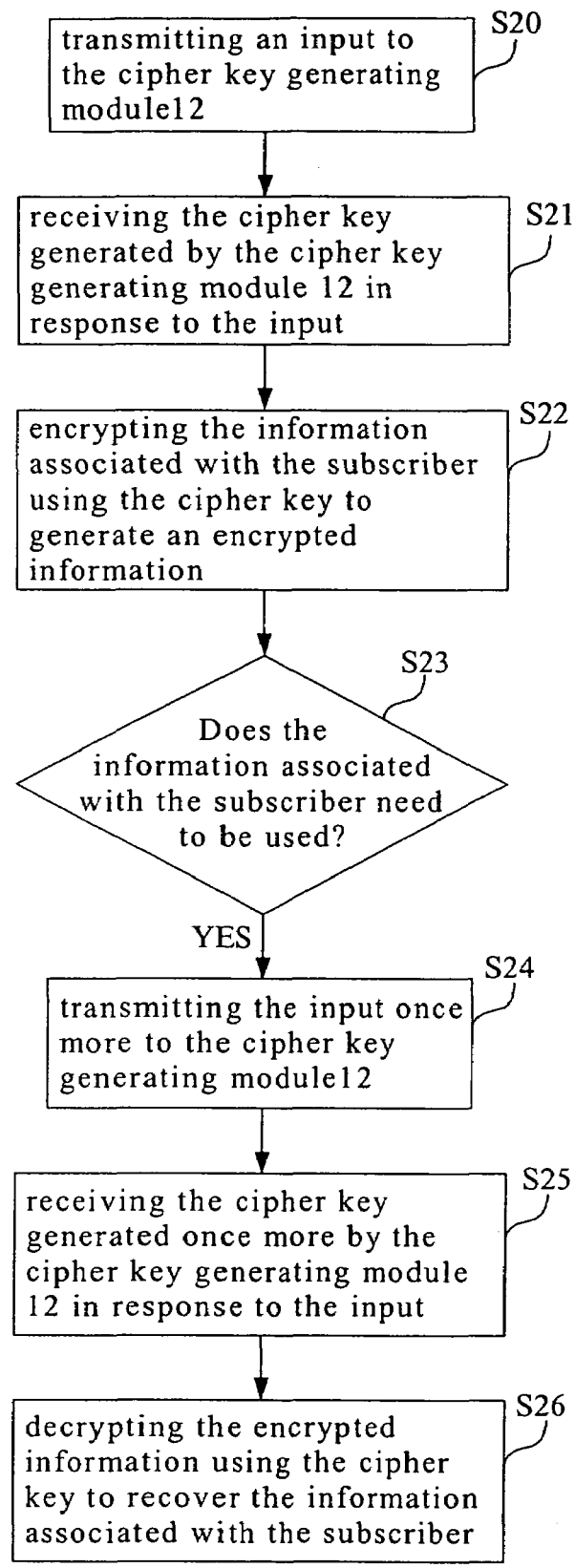
FIG. 2 is a flowchart illustrating the securing procedure according to the preferred embodiment of the present invention.

Please refer to FIG. 2. FIG. 2 is a flowchart illustrating the securing procedure according to the preferred embodiment of the present invention. The followings is the securing procedure of the secure advice 10 according to the preferred embodiment of the present invention. The securing procedure, performed in a communication apparatus 1, secures information associated with a subscriber. The communication apparatus 1 comprises a cipher-key generating module 12 for generating a cipher key. The procedure comprises the following steps:

S20: transmitting an input to the cipher-key generating module 12;

S21: receiving the cipher key generated by the cipher-key generating module 12 in response to the input;

S22: encrypting the information associated with the subscriber by using the cipher key, and generating the encrypted information;

S23: determining weather the information associated with the subscriber is necessary; if the answer in step S23 is YES, go to step S24;

S24: transmitting the input once more to the cipher-key generating module 12;

S25: receiving the cipher key generated once more by the cipher-key generating module 12 in response to the input;

S26: decrypting the encrypted information by using the cipher key, and recovering the information associated with the subscriber.

According to the second embodiment of the present invention, the input transmitted from the cipher-key acquiring module to the cipher-key generating module is a random input in order to secure the information associated with the subscriber emphatically. Hereinafter, the second embodiment of the present invention will be explained with reference to the attached drawings.

Figure 3:
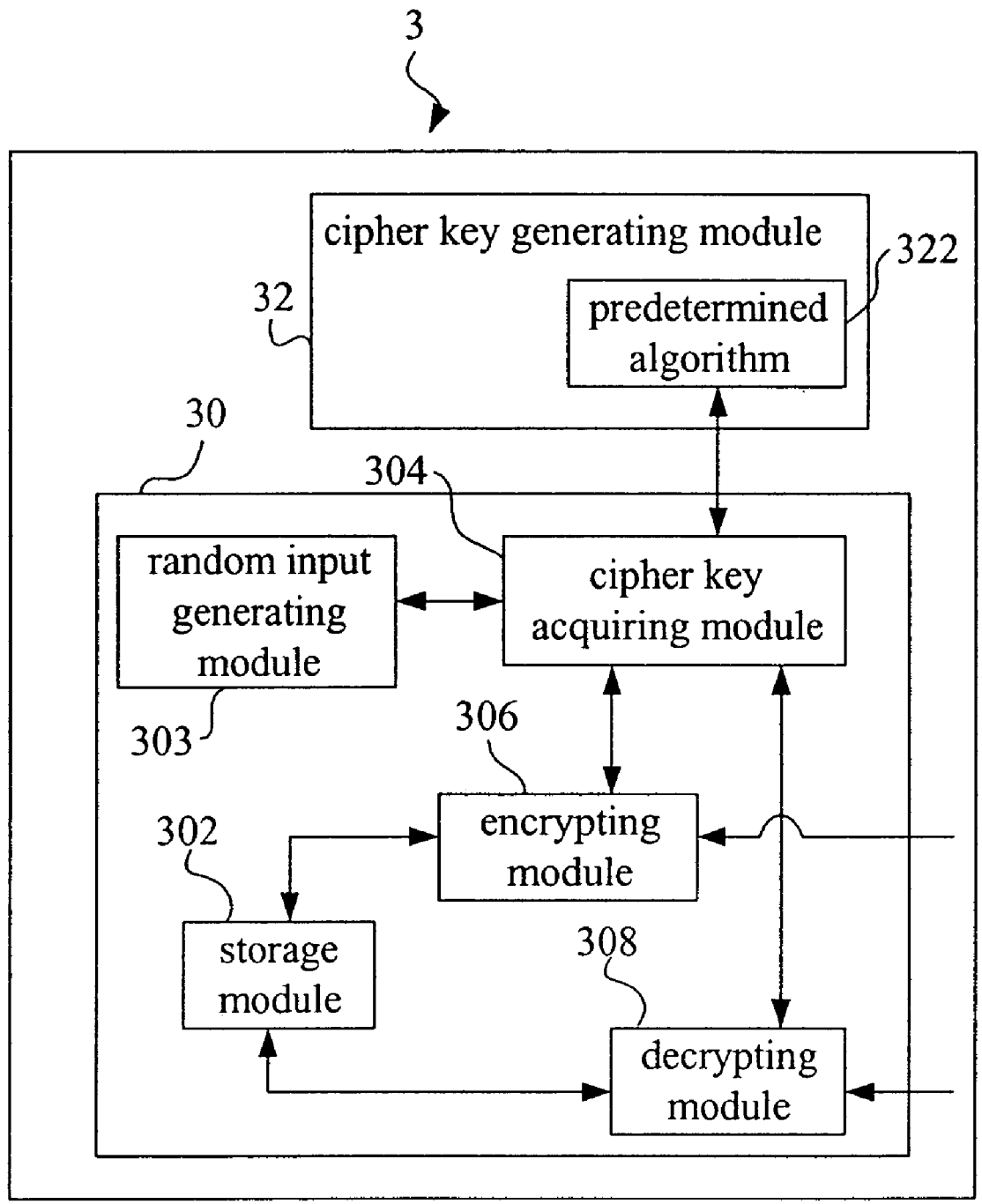
FIG. 3 is a schematic diagram showing a secure advice in a communication apparatus according to the second embodiment of the present invention, and showing the relationship between the secure device and the communication apparatus.

Referring FIG. 3, FIG. 3 is a schematic diagram showing a secure advice 30 in a communication apparatus 3 according to the second embodiment of the present invention. The secure advice 30 is used in the communication apparatus 3 for securing the personal private information in the communication apparatus 3. The communication apparatus 3 comprises a cipher-key generating module 32 for generating a cipher key.

The secure advice 30 comprises a storage module 302, a random-input generating module 303, a cipher-key acquiring module 304, an encrypting module 306, and a decrypting module 308. The information associated with the subscriber is stored in the storage module 302. The random-input generating module 303 generates a random input. The cipher-key acquiring module 304 receives the random inputs from the random-input generating module 303 and transmits the random input to the cipher-key generating module 32. After receiving the random inputs, the cipher-key generating module 32 generates the cipher key in response to the random input.

The cipher-key generating module 32 according to the embodiment of the present invention has a predetermined algorithm. The predetermined algorithm 322 is illustrated in FIG. 3. The random input is applied into the algorithm 322 to generate the cipher key.

The cipher-key generating module 32 according to the embodiment of the present invention is a Subscriber Identity Module (SIM) card. The predetermined calculating algorithm 322 can be Hash-based Message Authentication Code (HMAC), GSM-A3, or GSM-A8.

The encrypting module 306 retrieves the cipher key through the cipher-key acquiring module 304, and retrieves the information associated the subscriber from the storage module 302. Afterward the encrypting module 306 encrypts the information associated with the subscriber by the cipher key to generate the encrypted information. Wherein after the encrypted information is generated, the encrypted information is stored in the storage module 302 with the random input, and replaces the information associated with the subscriber stored in the storage module 302. As shown in FIG. 3, the encrypting module 306 is driven by the control signal from the communication apparatus 3 and then encrypts the information associated with the subscriber.

Furthermore, as information associated with the subscriber needs to be used, the decrypting module 308 retrieves the cipher key through the cipher-key acquiring module 304, retrieves the encrypted information from the storage module 302, and decrypts the encrypted information with the cipher key to recover the information associated with the subscriber. When the decrypting module 308 retrieves the cipher key through the cipher-key acquiring module 304, the cipher-key acquiring module 304 retrieves the random input from the cipher-key generating module 32, transmits the random input once more to the cipher-key generating module 32, and then receives the cipher key generated once more by the cipher-key generating module 32 in response to the random input. As shown in FIG. 3, the encrypting module 108 is driven by the control signal from the communication apparatus 3 and then decrypts the information associated with the subscriber.

The encrypting module 306 and the decrypting module 308 are implemented in a same module in practical application.

While the invention has been described in the preferred embodiments, it is obvious that it will strengthen the security of the information with the random input generated by the random-input generating module.

Figure 4:
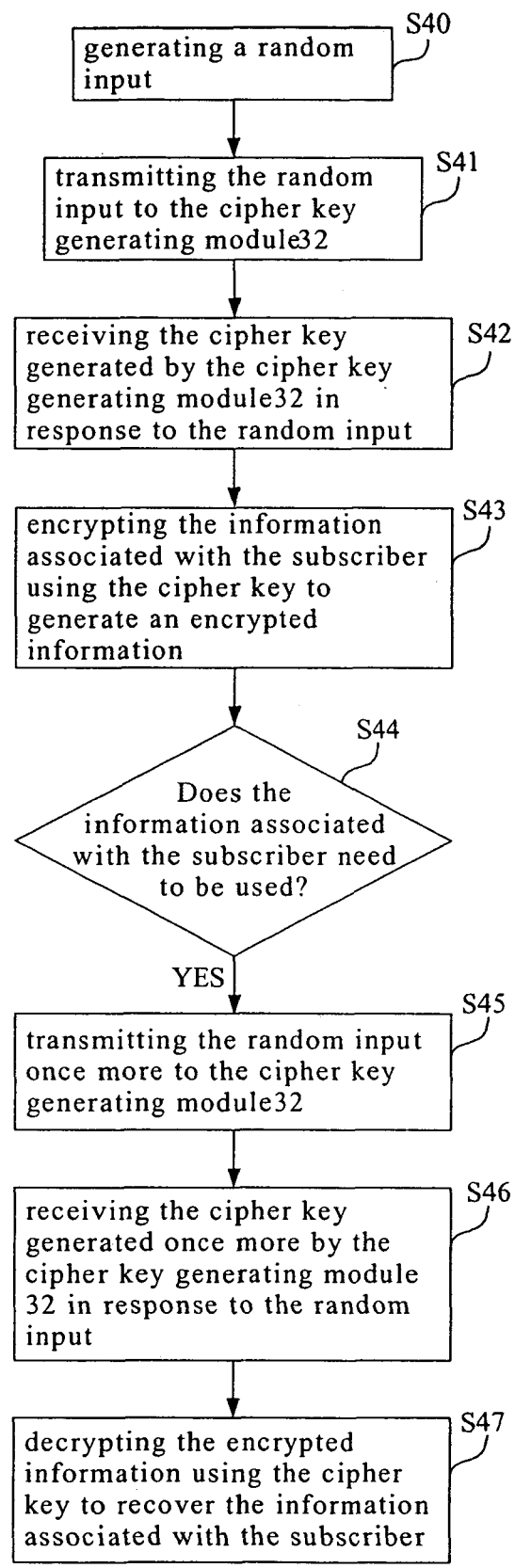
FIG. 4 is a flowchart illustrating the securing procedure according to the second embodiment of the present invention.

Please refer to FIG. 4. FIG. 4 is a flowchart illustrating the securing procedure according to the second embodiment of the present invention. The following illustrates the securing procedure of the secure advice 30 according to the second embodiment of the present invention. The securing procedure is implemented in a communication apparatus 3 for securing information associated with a subscriber. The communication apparatus 3 comprises a cipher-key generating module 32 for generating a cipher key. The procedure comprises the following steps:

S40: generating a random input;

S41: transmitting the random input to the cipher-key generating module 32;

S42: receiving the cipher key generated by the cipher-key generating module 32 in response to the random input;

S43: encrypting the information associated with the subscriber by using the cipher key, and generating the encrypted information;S44: determining weather the information associated with the subscriber is necessary; if the answer is YES, go to step S45.

S45: transmitting the random input once more to the cipher-key generating module 32;

S46: receiving the cipher key generated once more by the cipher-key generating module 32 in response to the random input;

S47: decrypting the encrypted information by using the cipher key, and recovering the information associated with the subscriber.

While the invention has been described in several preferred embodiments, it is understood that the words that have been used are words of description rather than words of limitation and that changes within the purview of the appended claims may be made without departing from the scope and spirit of the invention in its broader aspect.

What is claimed is:

1. A device, used in a communication apparatus, for securing an information associated with a subscriber, said communication apparatus comprising a cipher-key generating module for generating a cipher key, said device comprising:

a storage module, which the information associated with the subscriber, is stored in;

a cipher-key acquiring module for transmitting an input to the cipher-key generating module, and then receiving the cipher key generated by the cipher-key generating module in response to the input;

an encrypting module for retrieving the cipher key through the cipher-key acquiring module, retrieving the information associated the subscriber from the storage module, and encrypting the information associated with the subscriber using the cipher key to generate an encrypted information, wherein after generated, the encrypted information is stored in the storage module and replaces the information associated with the subscriber stored in the storage module; and a decrypting module for retrieving the cipher key through the cipher-key acquiring module, retrieving the encrypted information from the storage module, and decrypting the encrypted information using the cipher key to recover the information associated with the subscriber when the information associated with the subscriber needs to be used, and wherein when the decrypting module retrieves the cipher key through the cipher-key acquiring module, the cipher-key acquiring module transmits the input once more to the cipher-key generating module, and then receives the cipher key generated once more by the cipher-key generating module in response to the input.

2. The device of claim 1, wherein the input is a hardware serial number resident in the communication apparatus.

3. The device of claim 1, wherein the cipher-key generating module previously stores a subscriber code, and the cipher-key generating module outputs the subscriber code as the cipher key in response to the input.

4. The device of claim 1, where the cipher-key generating module is a SIM (Subscriber Information Module) card.

5. The device of claim 1, wherein the encrypting module and the decrypting module are implemented in the same module.

6. The device of claim 1, wherein the cipher-key generating module has a predetermined algorithm, and the input is applied into the predetermined algorithm to generate the cipher key.

7. The device of claim 6, wherein the predetermined algorithm is one selected from the group consisting of an HMAC (Hash-based Message Authentication Code) algorithm, a GSM-A3 algorithm and a GSM-A8 algorithm.

8. A device, used in a communication apparatus, for securing an information associated with a subscriber, said communication apparatus comprising a cipher-key generating module for generating a cipher key, said device comprising:

a storage module which the information associated with the subscriber is stored in;

a random input generating module for generating a random input;

a cipher-key acquiring module for receiving the random input from the random data generating module, transmitting the random input to the cipher-key generating module, and then receiving the cipher key generated by the cipher-key generating module in response to the random input;

an encrypting module for retrieving the cipher key through the cipher-key acquiring module, retrieving the information associated the subscriber from the storage module, and encrypting the information associated with the subscriber using the cipher key to generate an encrypted information, wherein after generated, the encrypted information is stored together with the random input in the storage module and replaces the information associated with the subscriber stored in the storage module; and a decrypting module for retrieving the cipher key through the cipher-key acquiring module, retrieving the encrypted information from the storage module, and decrypting the encrypted information using the cipher key to recover the information associated with the subscriber when the information associated with the subscriber needs to be used, and wherein when the decrypting module retrieves the cipher key through the cipher-key acquiring module, the cipher-key acquiring module retrieves the random input stored in the storage module, transmits the random input once more to the cipher-key generating module, and then receives the cipher key generated once more by the cipher-key generating module in response to the random input.

9. The device of claim 8, wherein the cipher-key generating module has a predetermined algorithm, and the random input is applied into the predetermined algorithm to generate the cipher key.

10. The device of claim 9, where the cipher-key generating module is a SIM (Subscriber Information Module) card.

11. The device of claim 10, wherein the predetermined algorithm is one selected from the group consisting of an HMAC (Hash-based Message Authentication Code) algorithm, a GSM-A3 algorithm and a GSM-A8 algorithm.

12. The device of claim 11, wherein the encrypting module and the decrypting module are implemented in the same module.

13. A method, performed in a communication apparatus, for securing an information associated with a subscriber, said communication apparatus comprising a cipher-key generating module for generating a cipher key, said method comprising the steps of:

transmitting an input to the cipher-key generating module;

receiving the cipher key generated by the cipher-key generating module in response to the input;

encrypting the information associated with the subscriber using the cipher key to generate an encrypted information; and when the information associated with the subscriber needs to be used, transmitting the input once more to the cipher-key generating module, receiving the cipher key generated once more by the cipher-key generating module in response to the input, and decrypting the encrypted information using the cipher key to recover the information associated with the subscriber.

14. The method of claim 13, wherein the input is a hardware serial number resident in the communication apparatus.

15. The method of claim 13, wherein the cipher-key generating module has a predetermined algorithm, and the input is applied into the predetermined algorithm to generate the cipher key.

16. The method of claim 13, wherein the cipher-key generating module previously stores a subscriber code, and outputs the subscriber code as the cipher key in response to the input.

17. The method of claim 13, where the cipher-key generating module is a SIM (Subscriber Information Module) card.

18. The method of claim 17, wherein the predetermined algorithm is one selected from the group consisting of an HMAC (Hash-based Message Authentication Code) algorithm, a GSM-A3 algorithm and a GSM-A8 algorithm.

19. A method, performed in a communication apparatus, for securing an information associated with a subscriber, said communication apparatus comprising a cipher-key generating module for generating a cipher key, said method comprising the steps of:

generating a random input;

transmitting the random input to the cipher-key generating module;

receiving a cipher key generated by the cipher-key generating module in response to the random input;

encrypting the information associated with the subscriber using the cipher key to generate an encrypted information; and when the information associated with the subscriber needs to be used, transmitting the random input once more to the cipher-key generating module, receiving the cipher key generated once more by the cipher-key generating module in response to the random input, and decrypting the encrypted information using the cipher key to recover the information associated with the subscriber.

20. The method of claim 19, wherein the cipher-key generating module has a predetermined algorithm, and the random input is applied into the predetermined algorithm to generate the cipher key.

21. The method of claim 20, where the cipher-key generating module is a SIM (Subscriber Information Module) card.

22. The method of claim 21, wherein the predetermined algorithm is one selected from the group consisting of an HMAC (Hash-based Message Authentication Code) algorithm, a GSM-A3 algorithm and a GSM-A8 algorithm.

* * * * *